(12) United States Patent
Oden

(10) Patent No.: US 7,719,740 B2
(45) Date of Patent: May 18, 2010

(54) HINGE MEMORY MITIGATION SYSTEM AND METHOD

(75) Inventor: Patrick Ian Oden, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 41 days.

(21) Appl. No.: 11/958,110

(22) Filed: Dec. 17, 2007

(65) Prior Publication Data

US 2009/0153941 A1 Jun. 18, 2009

(51) Int. Cl.
*G02B 26/08* (2006.01)
*G02B 26/00* (2006.01)

(52) U.S. Cl. .................................. 359/224.1; 359/290

(58) Field of Classification Search ............. 359/198, 359/224, 225, 290, 298, 315, 316
See application file for complete search history.

(56) References Cited

U.S. PATENT DOCUMENTS 7,349,146 B1 3/2008 Douglass

*Primary Examiner*—William C Choi
(74) *Attorney, Agent, or Firm*—Charles A. Brill; Wade James Brady, III; Frederick J. Telecky, Jr.

(57) ABSTRACT

Provided are a system and method for reducing failures due to hinge memory. The method, in one embodiment, includes providing a torsional element having an amount of hinge memory, wherein the hinge memory is at least partially created using an average operational temperature. The method, in this embodiment, further includes subjecting the torsional element having the hinge memory to a temperature equal to or greater than the average operational temperature while the torsional element is in a parked state for an amount of time to reduce the amount of the hinge memory.

22 Claims, 3 Drawing Sheets

HINGE MEMORY MITIGATION SYSTEM AND METHOD

TECHNICAL FIELD

The disclosure is directed, in general, to a system and method for display systems and, more specifically, to a system and method for reducing failures due to hinge memory in a display system.

BACKGROUND

A microdisplay display system uses an array of spatial light modulators (the microdisplay) to modulate light in order to display images on a display plane. The microdisplay can modulate light by reflectively altering the transmission path of the light or blocking the transmission path of the light. Microdisplay display systems have enabled the production of high quality display systems at a reasonable cost.

One widely used form of microdisplay is a digital micromirror device (DMD). A DMD is made up of an array of micromirrors that pivot along an axis depending upon an image being displayed. A single image can be divided into a number of bit planes, which when displayed sequentially, are integrated by the human eye into a single image. There are multiple bit planes for each color of light in the microdisplay display system. An individual micromirror can assume one of two states, ON or OFF. When a micromirror is in an ON state, the micromirror can reflect light from a light source onto the display plane, while when the micromirror is in an OFF state, the light is reflected away from the display plane. The combined effect of all the micromirrors in the microdisplay, in conjunction with sequentially colored light, produces images on the display plane.

FIGS. 1a and 1b illustrate two commonly used forms of micromirrors. The diagram shown in FIG. 1a illustrates what is commonly referred to as a yokeless micromirror 100 and the diagram shown in FIG. 1b illustrates a yoked micromirror 150. The yokeless micromirror 100 includes a mirror 105 that is attached to a hinge 110, with the entirety resting on a hinge support structure 115. The mirror 105 pivots about the hinge 110 based on image data of the image being displayed. The yoked micromirror 150, of FIG. 1b, also includes a mirror 155 that is attached to a yoke 160. The yoke 160 is attached to the hinge 165. Both the mirror 155 and the yoke 160 pivot about the hinge 165.

FIGS. 2a through 2d illustrate potential micromirror positions. When in normal operation, a micromirror 200 can be in one of two positions, a first position that corresponds to an ON position and a second position that corresponds to an OFF position. The diagram shown in FIG. 2a illustrates one of the two positions. When another bit plane is to be displayed, or when the micromirror is not in use (e.g., during the power down process or when the device is completely turned off), the micromirror can be commanded to move to a reset position (e.g., parked position). The diagram shown in FIG. 2b illustrates the reset or parked position. Once in the reset position, the micromirror can move to either the ON position or the OFF position depending on the value of the image data. The diagrams shown in FIGS. 2c and 2d illustrate the ON position and the OFF position, respectively.

As the micromirror (mirror) 105 moves, a torque is applied to the hinge 110 in the same direction as the movement of the micromirror 105. If the micromirror 105 is operated in such a way that the micromirror 105 predominantly moves towards one side (one position, either ON or OFF), an effect known as hinge memory can occur. Hinge memory can be the result of the migration of the hinge material. If allowed to persist for an extended amount of time, hinge memory can cause catastrophic failure of the micromirror 105. For example, in displaying an all black (or an all white) image, the micromirrors of the microdisplay will spend a vast majority of the time (e.g., greater than 95%) in a single position. Practical examples would include the superposition of a black box containing a close-caption text stream over the image in a television, or an information display panel with text on a dark background.

Accordingly, what is needed in the art is a hinge memory mitigation system and method, which is configured to address the aforementioned issues.

SUMMARY

To address the above-discussed deficiencies of the prior art, the disclosure provides a method for reducing hinge memory in a device. The method, in one embodiment, includes providing a torsional element having an amount of hinge memory, wherein the hinge memory is at least partially created using an average operational temperature. The method, in this embodiment, further includes subjecting the torsional element having the hinge memory to a temperature equal to or greater than the average operational temperature for an amount of time while the torsional element is in a parked state. Accordingly, the amount of the hinge memory is reduced.

Also provided is a method for operating a digital micromirror device based display system. This method, without limitation, includes initiating a power up cycle of a digital micromirror device including an array of micromirrors. The method further includes moving states of individual ones of the array of micromirrors between ON and OFF in a presence of a light source to display an image, wherein the moving occurs over an average operational temperature and at least partially creates an amount of hinge memory in the individual ones of the array of micromirrors. The method additionally includes initiating a power down cycle of the digital micromirror device including the array of micromirrors, and subjecting the array of micromirrors having the amount of hinge memory to a temperature greater than or equal to the average operational temperature for an amount of time while the individual ones of the array of micromirrors are in a parked state, the subjecting reducing the amount of hinge memory.

Additionally provided is a display system. The display device, in this embodiment, includes a light source, as well as an array of micromirrors optically coupled to the light source. The display device further includes control electronics configured to receive image data, and control the light source and a modulation of the array based upon the image data to produce one or more images on a display plane. The display device additionally includes a controller associated with the array, the controller configured to maintain a temperature at or increase a temperature above an average operational temperature thereof for an amount of time while individual ones of the array of micromirrors are in a parked state, for example to reduce an amount of hinge memory in the individual ones.

BRIEF DESCRIPTION OF THE DRAWINGS

For a more complete understanding of the disclosure, reference is now made to the following descriptions taken in conjunction with the accompanying drawings, in which.

DETAILED DESCRIPTION

Figure 1A:
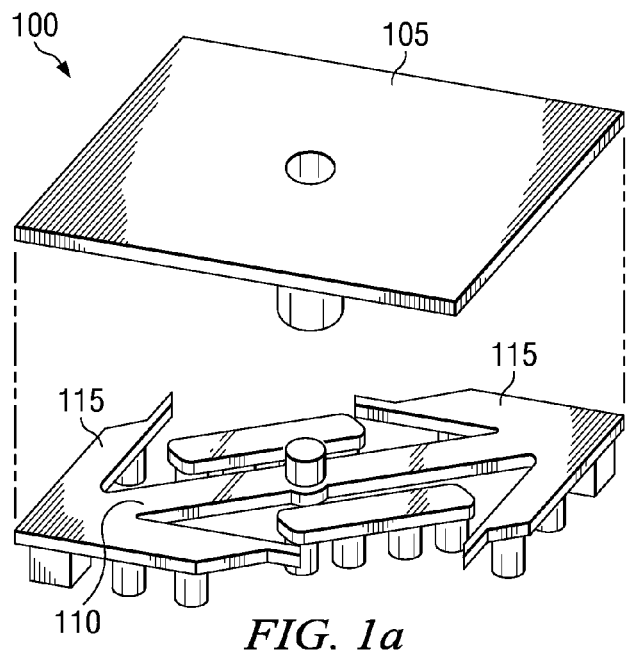
FIGS. 1a and 1b are diagrams of micromirrors.
Figure 1B:
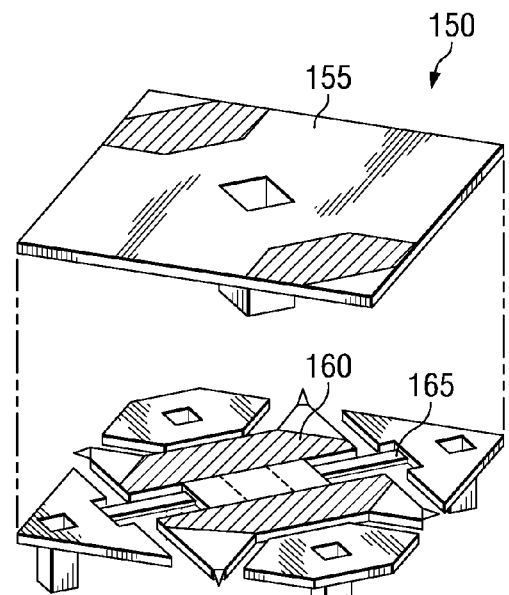
Figure 2A:
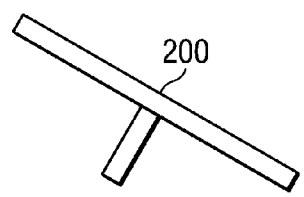
FIGS. 2a through 2d are diagrams of potential micromirror positions.
Figure 2B:
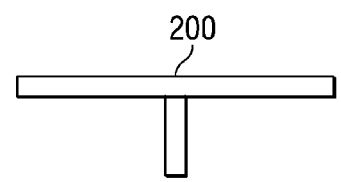
Figure 2C:
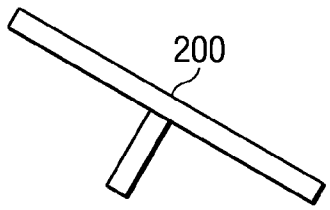
Figure 2D:
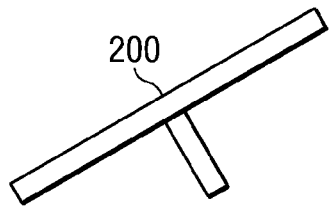

The making and using of certain embodiments is discussed in detail below. It should be appreciated, however, that the present disclosure provides many applicable concepts that can be embodied in a wide variety of specific contexts. The specific embodiments discussed are merely illustrative of specific ways to make and use certain concepts of the disclosure, and thus do not limit the scope thereof.

The present disclosure will be described with respect to certain embodiments in a specific context, namely a microdisplay display system using a digital micromirror device (DMD). The disclosure may also be applied, however, to other torsional elements, including other micro electrical mechanical systems (MEMS) having hinge memory issues.

The present disclosure is based, at least in part, on the acknowledgement that hinge memory set using a memory accumulation temperature (or average of memory accumulation temperatures) may be released or mitigated using equal to or higher memory relaxation temperature (or equal to or higher average of memory relaxation temperatures). The present disclosure further acknowledges that the amount of time required for a specific amount of hinge memory relaxation decreases exponentially as the hinge memory relaxation temperature increases above the memory accumulation temperature. Accordingly, the present disclosure recognizes that hinge memory accumulated over a period of hours may be relaxed, in one embodiment, over a period of minutes or seconds by increasing the hinge memory relaxation temperature.

Based upon the foregoing, the present disclosure recognizes that a torsional element (e.g., positional micromirror) having an amount of hinge memory accumulated using an average of temperatures while in a torqued state (e.g., landed state in one example), may be subjected to a hinge memory relaxation temperature equal to or greater than the average of temperatures while the torsional element is in a non-torqued state (e.g., parked state in one embodiment). By doing so, the accumulated hinge memory is mitigated, if not eliminated. Additionally, the present disclosure recognizes that the torsional element may be subjected to the hinge memory relaxation temperature while the torsional element is not in operation (e.g., while undergoing a power down cycle, or while the device is not in use). Accordingly, hinge memory relaxation temperatures above the maximum specification temperature (e.g., of the device incorporating the torsional element) may be used without serious harm to the device.

An advantage of one embodiment of the present disclosure is that it is inexpensive and easy to implement in microdisplay display systems. Moreover, it may be used while the microdisplay display systems are not in operation, and thus consume very little electricity. Therefore, a significant increase in product life can be achieved with very little investment.

A further advantage of one embodiment of the disclosure is that it is effective in reducing and potentially eliminating hinge memory. Significant reductions in hinge memory can be achieved with short applications of the present disclosure. Therefore, extended periods of microdisplay display system downtime are not needed to implement the present disclosure.

Figure 3:
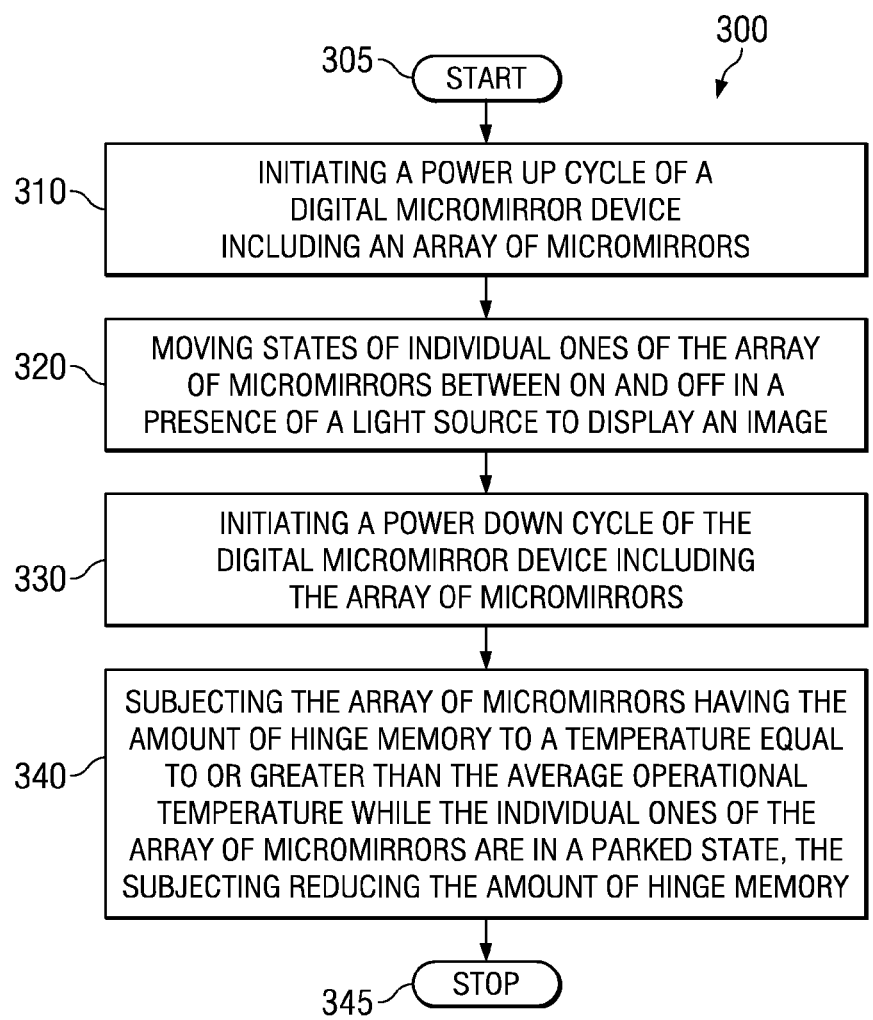
FIG. 3 illustrates a flow diagram depicting one embodiment of a method for operating a display system.

FIG. 3 illustrates a flow diagram 300 depicting one embodiment of a method for operating a display system (e.g., a digital micromirror device based display system). The flow diagram 300, in addition to the method for operating the display system, includes a subset including a method for reducing hinge memory. Accordingly, the flow diagram 300 should not be used to limit the disclosure to any specific steps. For example, a method for reducing hinge memory according to this disclosure could be used in a context that does not include operating the display system. It should additionally be noted that, in certain embodiments, the order of the steps in FIG. 3 may change. Accordingly, flow diagram 300 denotes no specific order, as well as can be repeated any number of times.

The flow diagram 300 of FIG. 3 begins in a start step 305. Thereafter, for example in a step 310, a power up cycle may be initiated for the display system. The power up cycle may be initiated in a number of different ways. In one specific embodiment, however, the power up cycle is initiated by the user of the device by pressing the power button thereof. The pressing of the power button, among other effects, may provide power to the active circuitry of the display device, including providing power to the active circuitry of an array of micromirrors therein.

In a step 320, typically after performing step 310, the display system may be used to display an image. For example, states of the individual ones of the array of micromirrors may be moved between an ON state and an OFF state in the presence of a light source to display the image. The movement of the micromirrors occurs while the display system operates at one or more different operational temperatures (e.g., an average operational temperature). It is this movement of the array of micromirrors, and more specifically the disparate use of individual ones of the array of micromirrors in one state or the other, that tends to cause hinge memory within the array of micromirrors.

In a step 330, after displaying one or more images, a power down cycle of the digital micromirror device may be initiated. The power down cycle, similar to the power up cycle, may be initiated by the user of the device by pressing the power button thereof. Other embodiments exist wherein the power down cycle is initiated using another procedure.

The initiation of the power down cycle, in one embodiment, moves the ones of the array of micromirrors to a parked state. The term parked state, as used throughout this disclosure, means an equilibrium state of a micromirror or torsional element. Accordingly, the parked state of a micromirror or torsional element would be the position the micromirror or torsional element would achieve were no signal or voltage being applied to the associated address electrodes. In one embodiment, the power down cycle includes the removal of power to the circuitry driving the digital micromirror device, as well as possibly the display system as a whole. Those skilled in the art understand the steps that may be associated with a power down cycle, as well as the steps required to initiate such.

In a step 340, in this embodiment after step 330, the array of micromirrors having the hinge memory is subjected to a temperature equal to or greater than the average operational temperature. For example, the array of micromirrors may be subjected to the equal or greater temperature while ones of the array of micromirrors are in the parked state. The combination of the array of micromirrors being located in the parked state, as well as the increased temperature, tends to relax the hinge memory within a shorter period of time than might occur if a lesser temperature were used.

The specific value of the equal or greater temperature may vary depending on how quickly one desired to relax the hinge memory. For example, in one embodiment the device has a maximum specification temperature, and the greater temperature is higher than the maximum specification temperature. For instance, the device might have a specification temperature ranging from about 0° C. to about 65° C., and the greater temperature might be greater than 65° C. In yet another embodiment, the greater temperature might be at least about 150% of the maximum specification temperature (e.g., 65° C. in the above example).

The equal or greater temperature may be achieved using passive means, active means, or a combination of such. In one example embodiments the equal or greater temperature is achieved passively by reducing an output of a cooling source of the display system. For example, the output of one or more cooling fans (e.g., typically used to keep temperatures low) of the display system may be reduced, if not stopped, to allow the environment surrounding the array of micromirrors to stay the same or increase. In yet another example embodiment, a heating source is included within the display system to actively maintain or heat the array of micromirrors. A resistive heater, among others, might be used in such an embodiment.

The equal or greater temperature would, in one embodiment, be maintained for a period of time sufficient to reduce, if not eliminate, the hinge memory. In those example embodiments wherein temperatures significantly greater than the maximum specification temperature are used, the hinge memory may be addressed in a few minutes or less. After the array of micromirrors has been subjected to the equal or greater temperature for a appropriate amount of time, the process can terminate in a stop step 345.

Figure 4:
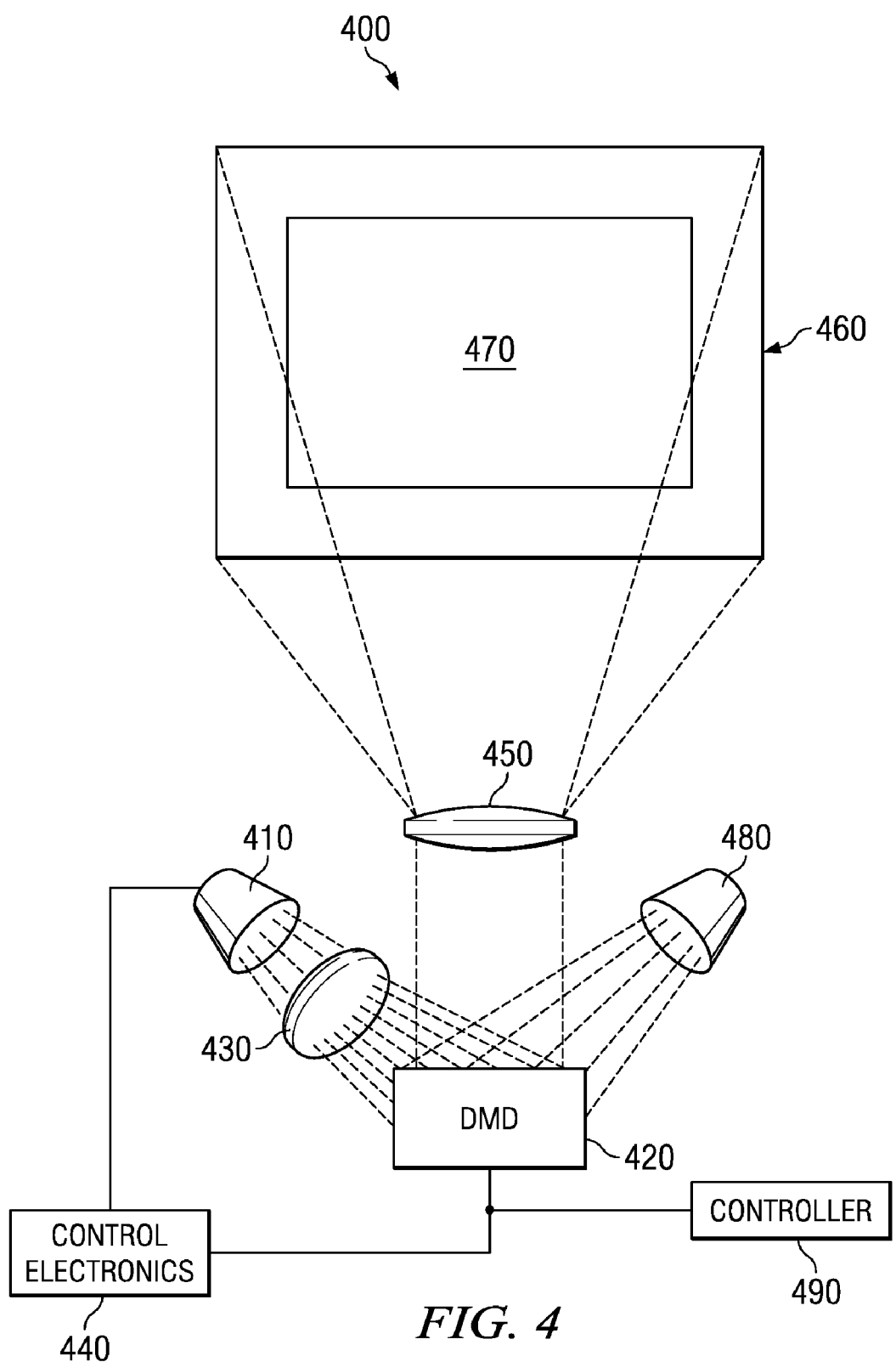
FIG. 4 illustrates a block diagram of a display system incorporating digital micromirror device(s) manufactured and operated in accordance with the principles of the present disclosure.

FIG. 4 illustrates a block diagram of a display system 400 (e.g., projection display system) incorporating digital micromirror device(s) manufactured and operated in accordance with the principles of the disclosure. In the display system illustrated in FIG. 4, illumination from a light source 410 is focused on to the surface of one or more DMD(s) 420 by means of a condenser lens 430 placed in the path of the light. Control electronics 440 are connected to both the DMD(s) 420 and the light source 410 and used to modulate the DMD(s) 420 and to control the light source 410.

For all DMD pixels in the ON state, the incoming light beam is reflected into the focal plane of a projection lens 450, where it is magnified and projected on to a viewing screen 460 to form an image 470. On the other hand, DMD pixels in the OFF state, as well as any stray light reflected from various near flat surfaces on and around the DMD, are reflected into a light trap 480 and discarded.

A controller 490 is additionally connected to the DMD(s) 420, and thus associated with the array of micromirrors therein. The controller 490 is configured to maintain or increase a temperature of the array at or above an average operation temperature thereof. The controller 490 is additionally configured to move ones of the array of micromirrors to a parked state while being subjected to the equal or greater temperature, for example during a power down cycle.

In one embodiment wherein an active heating source is used to maintain or increase the temperature, the controller 490 might be connected to the heating source. In yet another embodiment wherein passive heating is used, the controller 490 might be connected to one or more cooling sources of the display system 400 to reduce their output. Ultimately, the controller 490 may be configured to control all aspects of the display system needed to reduce, if not eliminate, the hinge memory in the ones of micromirrors.

Descriptions of the DMD, DMD fabrication, and DMD-based display systems can be found in greater detail in the following coassigned U.S. patents: U.S. Pat. No. 4,566,935, issued Jan. 28, 1986, entitled "Spatial Light Modulator and Method," U.S. Pat. No. 4,615,595, issued Oct. 7, 1986, entitled "Frame Addressed Spatial Light Modulator," U.S. Pat. No. 4,662,746, issued May 5, 1987, entitled "Spatial Light Modulator and Method," U.S. Pat. No. 5,061,049, issued Oct. 29, 1991, entitled "Spatial Light Modulator and Method," U.S. Pat. No. 5,083,857, issued Jan. 28, 1992, entitled "Multi-Level Deformable Mirror Device," U.S. Pat. No. 5,096,279, issued Mar. 17, 1992, entitled "Spatial Light Modulator and Method," and U.S. Pat. No. 5,583,688, issued Dec. 10, 1996, entitled "Multi-Level Digital Micromirror Device," which patents are hereby incorporated herein by reference.

The term "providing", as used in the context of this disclosure, means that the feature may be obtained from a party having already manufactured the feature, or alternatively may mean manufacturing the feature themselves and providing it for its intended purpose.

Although the present disclosure has been described in detail, those skilled in the art should understand that they could make various changes, substitutions and alterations herein without departing from the spirit and scope of the disclosure in its broadest form.

What is claimed is:

1. A method for reducing hinge memory in a device, comprising:
providing a torsional element having an amount of hinge memory, wherein the hinge memory is at least partially created using an average operational temperature; and
subjecting the torsional element having the hinge memory to a temperature equal to or greater than the average operational temperature while the torsional element is in a parked state for an amount of time to reduce the amount of the hinge memory.

2. The method of claim 1 wherein the subjecting occurs while the device is undergoing a power down cycle.

3. The method of claim 1 wherein the subjecting includes obtaining the equal or greater temperature passively by reducing an output of a cooling source of the device.

4. The method of claim 3 wherein the cooling source comprises one or more fans.

5. The method of claim 1 wherein the subjecting includes obtaining the equal or greater temperature by actively heating the torsional element using a heating source.

6. The method of claim 1 wherein subjecting the torsional element to the temperature equal to or greater than the average operational temperature includes subjecting the torsional element to the temperature greater than the average operational temperature.

7. The method of claim 1 wherein the device has a maximum specification temperature, and further wherein the greater temperature is higher than the maximum specification temperature.

8. A method for operating a digital micromirror device based display system, comprising:
initiating a power up cycle of a digital micromirror device including an array of micromirrors;
moving states of individual ones of the array of micromirrors between ON and OFF in a presence of a light source to display an image, wherein the moving occurs over an average operational temperature and at least partially creates an amount of hinge memory in the individual ones of the array of micromirrors;

initiating a power down cycle of the digital micromirror device including the array of micromirrors; and subjecting the array of micromirrors having the amount of hinge memory to a temperature equal to or greater than the average operational temperature while the individual ones of the array of micromirrors are in a parked state for an amount of time to reduce the amount of hinge memory.

9. The method of claim 8 wherein the subjecting occurs during the power down cycle.

10. The method of claim 8 wherein the subjecting includes obtaining the equal or greater temperature passively by reducing an output of a cooling source of the display system.

11. The method of claim 10 wherein the cooling source comprises one or more fans.

12. The method of claim 8 wherein the subjecting includes obtaining the equal or greater temperature by actively heating the picture element using a heating source.

13. The method of claim 8 wherein the digital micromirror device based display system has a maximum specification temperature, and further wherein the greater temperature is higher than the maximum specification temperature.

14. The method of claim 13 wherein the greater temperature is at least about 150% of the maximum specification temperature.

15. The method of claim 8 wherein subjecting the array of micromirrors to the temperature equal to or greater than the average operational temperature includes subjecting the array of micromirrors to the temperature greater than the average operational temperature.

16. A display system, comprising:
a light source;
an array of micromirrors optically coupled to the light source;
control electronics operable to receive image data, and control the light source and a modulation of the array based upon the image data to produce one or more images on a display plane; and
a controller associated with the array, the controller operable to maintain a temperature of the array at or increase a temperature of the array above an average operational temperature thereof while individual ones of the array of micromirrors are in a parked state for an amount of time to reduce an amount of hinge memory in the individual ones.

17. The display system as recited in claim 16 further including projection optics optically coupled to the array of micromirrors, the projection optics operable to magnify and project the one or more images on to a viewing screen.

18. The display system of claim 16 wherein the controller is operable to maintain or increase the temperature during a power down cycle of the display system.

19. The display system of claim 16 further including a cooling source operable to control the average temperature, wherein the controller is operable to passively maintain or increase the temperature by reducing an output of the cooling source.

20. The display system of claim 16 further including a heating source, wherein the controller is operable to actively maintain or increase the temperature using the heating source.

21. The display system of claim 16 wherein the display system has a maximum specification temperature, and further wherein the controller is operable to increase the temperature of the display system above the maximum specification temperature while the individual ones of the array of micromirrors are in the parked state.

22. The display system of claim 16 wherein the controller is operable to increase the temperature of the array above the average operational temperature.

* * * * *